US012175896B2

(12) United States Patent
Huang et al.

(10) Patent No.: US 12,175,896 B2
(45) Date of Patent: Dec. 24, 2024

(54) LED ARC DISPLAY

(71) Applicant: STAR ASIA VISION CORPORATION, Hsinchu (TW)

(72) Inventors: Kuo-Shu Huang, Hsinchu (TW); Shang-Chien Wu, Hsinchu (TW); Tsung-Huai Lee, Hsinchu (TW)

(73) Assignee: STAR ASIA VISION CORPORATION, Hsinchu (TW)

( * ) Notice: Subject to any disclaimer, the term of this patent is extended or adjusted under 35 U.S.C. 154(b) by 0 days.

(21) Appl. No.: 17/385,098

(22) Filed: Jul. 26, 2021

(65) Prior Publication Data

US 2022/0223075 A1 Jul. 14, 2022

Related U.S. Application Data

(60) Provisional application No. 63/134,968, filed on Jan. 8, 2021.

(51) Int. Cl.

| | |
|---|---|
| ***G09F 9/302*** | (2006.01) |
| ***F21V 33/00*** | (2006.01) |
| ***G09F 9/30*** | (2006.01) |
| *F21Y 105/16* | (2016.01) |
| *F21Y 113/13* | (2016.01) |
| *F21Y 115/10* | (2016.01) |

(52) U.S. Cl.

CPC ........ *G09F 9/3026* (2013.01); *F21V 33/0052* (2013.01); *G09F 9/301* (2013.01); *F21Y 2105/16* (2016.08); *F21Y 2113/13* (2016.08); *F21Y 2115/10* (2016.08)

(58) Field of Classification Search

CPC ...... G09F 9/301; G09F 9/3026; G09F 9/3023; G09F 9/302; F21Y 2105/16; H05K 1/028; H05K 1/147

See application file for complete search history.

(56) References Cited

U.S. PATENT DOCUMENTS

| | | | | |
|---|---|---|---|---|
| 6,154,362 A * | 11/2000 | Takahashi | G09F 9/3026 | 362/218 |
| 7,663,715 B2 * | 2/2010 | Jin | G02F 1/13336 | 362/617 |
| 8,885,120 B2 * | 11/2014 | Ben-David | G02B 5/201 | 362/97.3 |
| 10,342,093 B2 * | 7/2019 | Homer | F21K 9/69 | |
| 11,079,997 B2 * | 8/2021 | Cope | G09F 9/30 | |
| 2003/0227774 A1 * | 12/2003 | Martin | F21V 29/77 | 362/240 |
| 2008/0252197 A1 * | 10/2008 | Li | H05B 45/46 | 313/502 |
| 2015/0292716 A1 * | 10/2015 | Yamazaki | H01L 51/0097 | 362/249.08 |

FOREIGN PATENT DOCUMENTS

CN 110379319 A * 10/2019

* cited by examiner

*Primary Examiner* — Omar Rojas Cadima

(74) *Attorney, Agent, or Firm* — Muncy, Geissler, Olds & Lowe, P.C.

(57) ABSTRACT

An LED arc display includes at least one LED matrix array module. Each LED matrix array module is composed of a plurality of LED matrix units arranged regularly. Each LED matrix unit includes a display surface, and the display surface has an outer contour. The outer contour is a non-quadrilateral. Therefore, a non-smooth visual experience caused by assembly tolerances of the plurality of LED matrix units can be improved by using non-quadrilateral outer contours of each LED matrix unit.

8 Claims, 6 Drawing Sheets

LED ARC DISPLAY

This application claims priority of U.S. Provisional Application No. 63/134,968 filed on Jan. 8, 2021 under 35 U.S.C. § 119 (e), the entire contents of all of which are hereby incorporated by reference.

FIELD OF THE INVENTION

The present disclosure relates to the field of display technology, particularly, to a modularized light emitting diode (LED) arc display.

BACKGROUND OF THE INVENTION

An LED display device has advantages such as lower power consumption, reduced volume and better image display as compared to a traditional LCD display device and is thus gradually being accepted by the general public. In recent years, arc display devices have been widely adopted and gradually becoming the mainstream of the market.

Currently, a large-area arc display (A) commonly seen on the market is formed by arranging and assembling a plurality of quadrilateral (for example, rectangular or trapezoidal) LED matrix light-emitting units. However, in the assembly process of the plurality of LED matrix light-emitting units, any two adjacent LED matrix light-emitting units are highly likely to form a discontinuity in contour due to tolerance, gap, break or other factors, and thus unable to form a smooth arc display. For example, a traditional LED arc display (A) is shown in FIG. 1, wherein each block represents an independent LED matrix light-emitting unit (a), and each LED matrix light-emitting unit is quadrilateral. The LED arc display (A) can be assembled from the plurality of LED matrix light-emitting units. In theory, when a plurality of LED matrix light-emitting units (a) along the same latitudinal position are fully aligned, both the upper and lower sides should keep a straight line. However, in practice, in the assembly process, the plurality of LED matrix light-emitting units (a) may not align due to the assembly tolerance, making splicing tolerance and/or break gap formed on the arc noticeable to the human eye, further resulting in a unsmooth visual experience. Therefore, how to design an LED arc display to solve the aforesaid problem is truly a task worth studying.

SUMMARY OF THE INVENTION

The objective of the present disclosure is to provide a modularized LED arc display.

In order to achieve the aforesaid objective among others, the LED arc display of the present disclosure includes at least one LED matrix array module. Each LED matrix array module is composed of a plurality of LED matrix units arranged regularly. Each LED matrix unit includes a display surface, and the display surface has an outer contour. The outer contour is a non-quadrilateral.

In an embodiment of the present disclosure, each LED matrix unit further includes a plurality of LED components, wherein each LED component includes a plurality of light sources of different colors, and the order of arrangement of the plurality of light sources of each LED component is different from the order of arrangement of the plurality of light sources of the adjacent LED component.

In an embodiment of the present disclosure, the outer contour of the display surface forms a protrusion portion and a recess portion, and the shape of the protrusion portion corresponds to the shape of the recess portion.

In an embodiment of the present disclosure, wherein the outer contour of the display surface has at least five sides.

In an embodiment of the present disclosure, the outer contour of the display surface is hexagonal.

In an embodiment of the present disclosure, the display surface is structurally symmetrical about the longitudinal line.

In an embodiment of the present disclosure, at least two sides of the outer contour of the display surface are parallel in the longitudinal direction.

In an embodiment of the present disclosure, the LED arc display further includes at least one adjustment component, the least one adjustment component being connected to at least one LED matrix array module so as to adjust the least one LED matrix array module by means of the least one adjustment component about at least one of the three axes.

In an embodiment of the present disclosure, the curvature of the display surface about the longitudinal direction is 1.4 degrees.

In an embodiment of the present disclosure, the curvature of the display surface about the latitudinal direction is 1.5 degrees.

In an embodiment of the present disclosure, the LED arc display further includes at least one support frame, wherein the at least one LED matrix array module is disposed on the at least one support frame.

Accordingly, the LED arc display of the present disclosure adopts LED matrix units having non-quadrilateral outer contours to improve the unsmooth visual perception generated by the assembled plurality of LED matrix units due to assembly tolerance.

DETAILED DESCRIPTION OF THE PREFERRED EMBODIMENTS

Since various aspects and embodiments are only illustrative and non-limiting, after reading this specification, those with ordinary knowledge may have other aspects and embodiments without departing from the scope of the present disclosure. According to the following detailed description and patent application scope, the features and advantages of these embodiments will be more prominent.

In present disclosure, "a" or "an" is used to describe the units, elements, and components described herein. This is done for convenience of description only and providing a general meaning to the scope of the present disclosure. Therefore, unless clearly stated otherwise, the description should be understood to include one, at least one, and the singular can also include plural.

In this disclosure, the terms “including”, “having”, “containing” or any other similar terms are intended to encompass non-exclusive inclusive. For example, a component, structure, article, or device that contains a plurality of elements is not limited to such elements as listed herein but may include those not specifically listed but which are typically inherent to the component, structure, article, or device. In addition, the term “or” means an inclusive “or” rather than an exclusive “or” unless clearly stated to the contrary.

Figure 2:
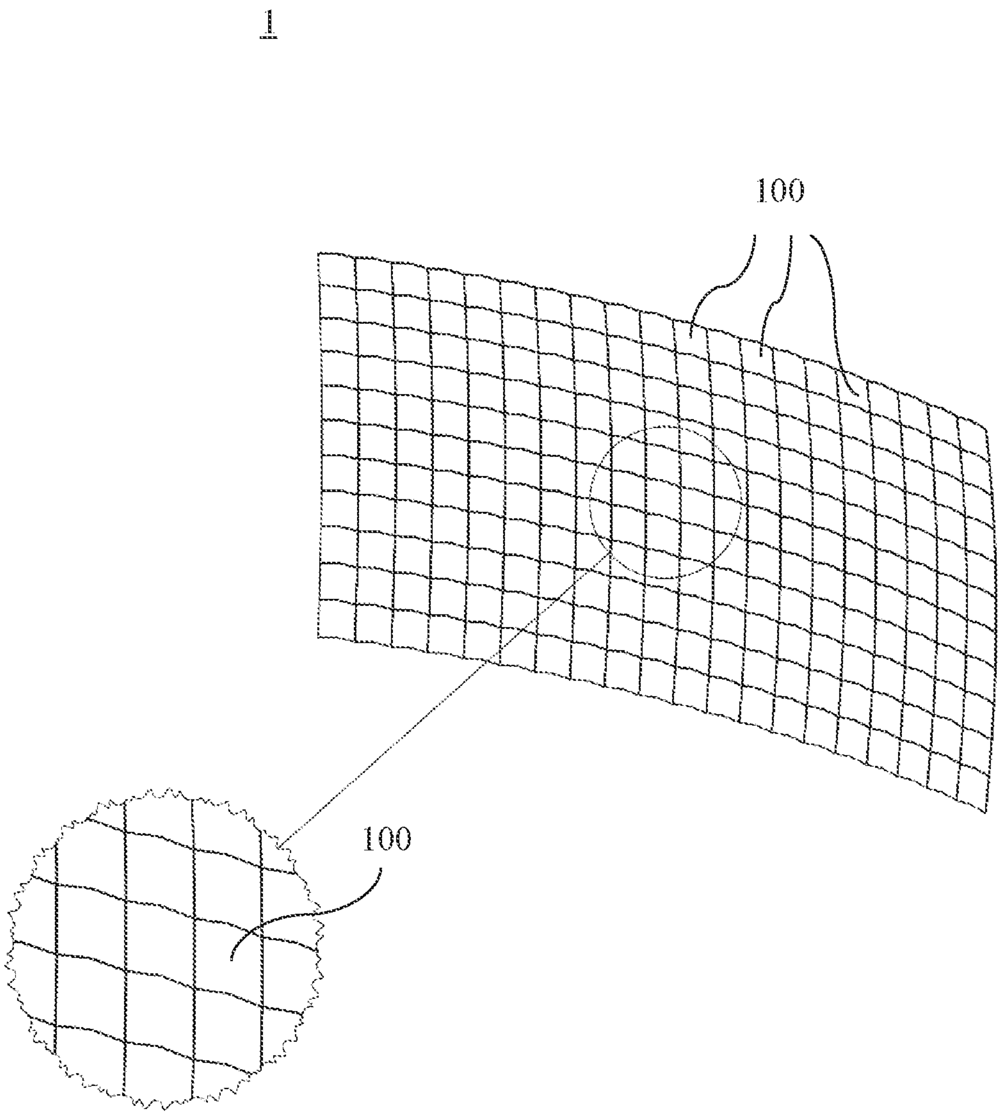
FIG. 2 is a schematic of the assembled LED arc display of the present invention.
Figure 3:
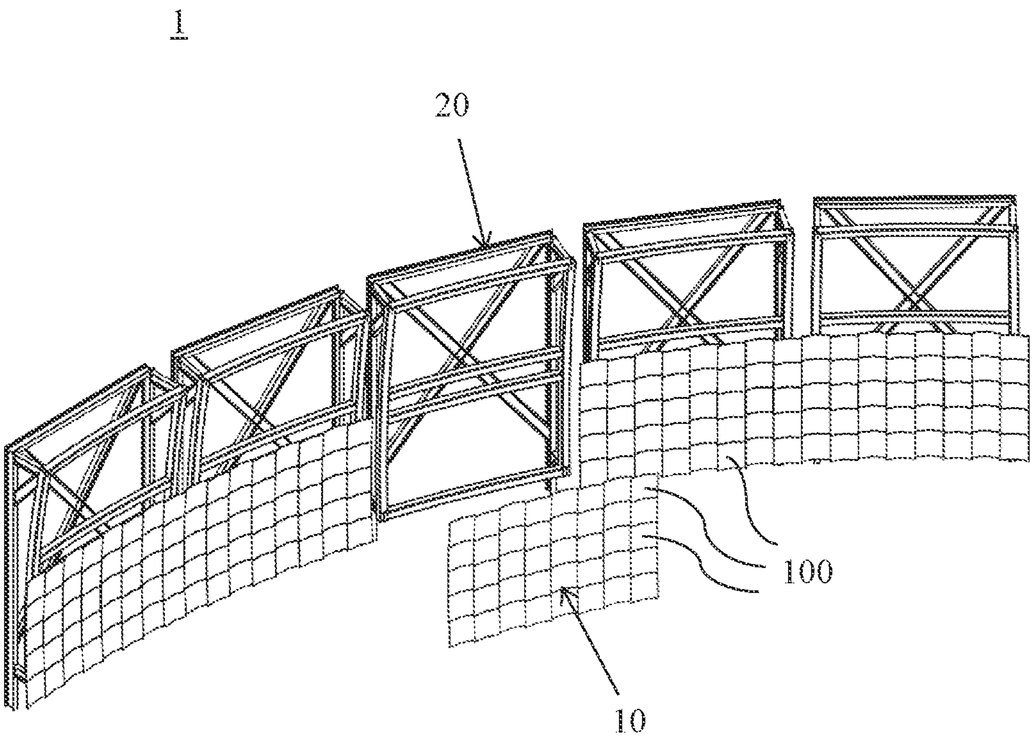
FIG. 3 is a partial schematic of the LED arc display of the present invention during assembly.

Please refer to FIG. 2 and FIG. 3, wherein FIG. 2 is a schematic of the assembled LED arc display of the present invention, and FIG. 3 is a partial schematic of the LED arc display of the present invention during assembly. As shown in FIG. 2 and FIG. 3, the LED arc display 1 of the present invention includes at least one LED matrix array module 10. Each LED matrix array module 10 is composed of a plurality of LED matrix units arranged regularly. In other words, the LED arc display 1 of the present invention is basically composed of the plurality of LED matrix units 100. In the assembly process of the LED arc display 1 of the present invention, a predetermined number of plural LED matrix units 100 may be combined into an independent LED matrix array module 10 (for example, in FIG. 3 the LED matrix array module 10 is composed of plural LED matrix units 100 with an 8×5 matrix specification, but the present invention is not limited thereto); namely, the plural LED matrix units 100 are modularized. The plural LED matrix array modules 10 are further combined into the LED arc display 1 of required size, or a single LED matrix array module 10 is directly used as the LED arc display 1, depending on different requirements. The post-modularized LED matrix array module 10 can increase the convenience of transportation, assembly and installation, thereby effectively reducing assembly time.

In an embodiment of the present invention, the LED arc display 1 of the present invention further includes at least one support frame. The at least one LED matrix array module 10 is disposed on the at least one support frame 20, causing the at least one LED matrix array module 10 to be fixed and supported by the at least one support frame 20, thereby composing the LED arc display 1 of the present invention. Based on different number of the LED matrix array modules 10 being disposed, the LED arc display 1 of the present invention may take the form of a curved display, a spherical display or other forms of display, but the present invention is not limited thereto.

In addition, in order to conveniently adjust the location or direction of each LED matrix array module 10 being disposed, in an embodiment of the present invention, the LED arc display 1 of the present invention further includes at least one adjustment component (not shown). The least one adjustment component is connected to the at least one LED matrix array module 10, for example, on the side of the LED matrix array module 10 facing the support frame 20, so as to adjust the location or angle of the least one LED matrix array module 10 by means of the least one adjustment component 30 about at least one of the three axes (x-axis, y-axis, z-axis) of the rectangular coordinate system. The number of the adjustment component 30 may be changed pursuant to requirements, for example, a number of adjustment components may be disposed corresponding to the number of the LED matrix array modules 10, or a single adjustment component may be disposed for multiple LED matrix array modules 10.

Figure 4:
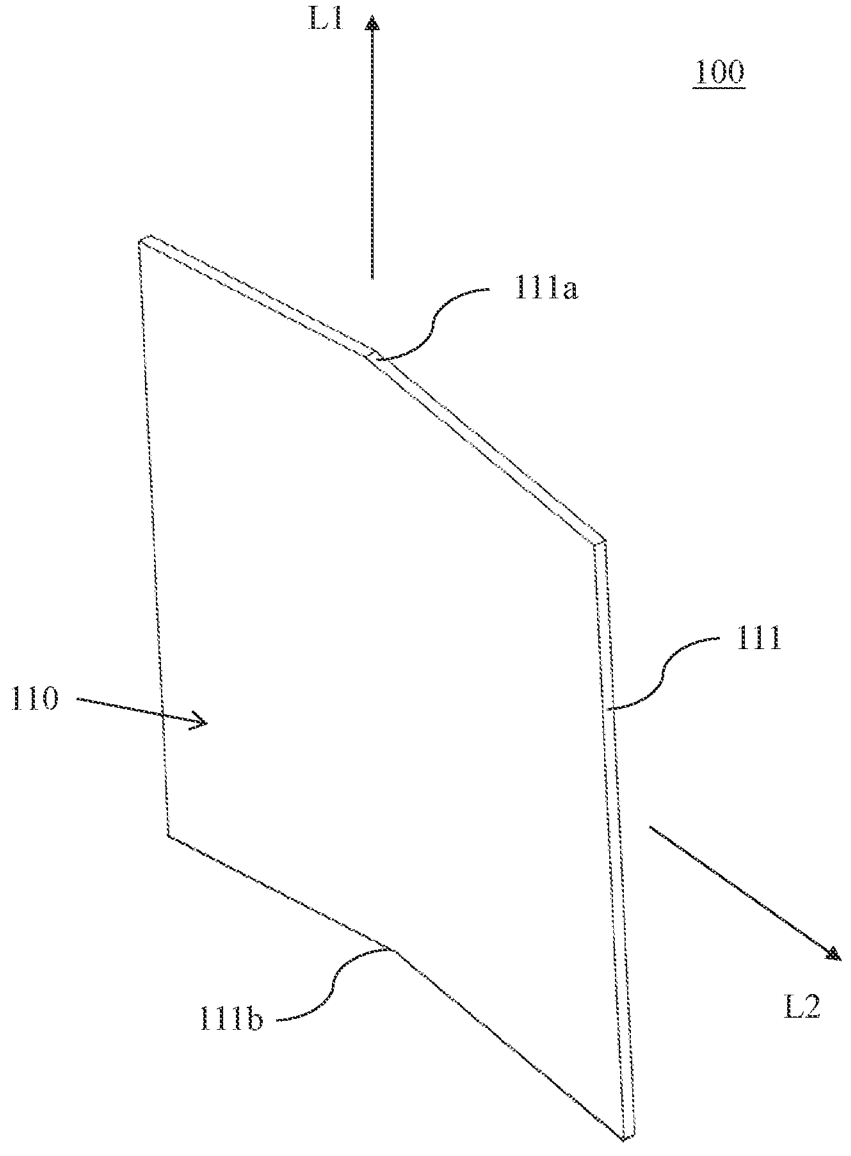
FIG. 4 is a schematic of an LED matrix unit of the LED arc display of the present invention.

Please refer to FIG. 2 to FIG. 4 altogether, wherein FIG. 4 is a schematic of an LED matrix unit of the LED arc display of the present invention. As shown in FIG. 2 to FIG. 4, the LED matrix unit 100 includes a display surface 110 and plural LED elements (not shown, please refer to FIG. 6), and the display surface 100 is composed of plural LED elements arranged in the form of a matrix. The display surface 110 is disposed on the front side of the LED matrix unit 100, which is the side facing away from the support frame 20. In order to form the LED arc display of the present invention, the display surface 110 of the LED matrix unit 100 is designed to be a n arc, and the curvature of the arc about the longitudinal direction L1 and the latitudinal direction L2 varies with the entire display scope and/or the number of the LED matrix units of the LED arc display 1 of the present invention.

In an embodiment of the present invention, the curvature of the display surface about the longitudinal direction is 1.4 degrees, while the curvature of the display surface about the latitudinal direction is 1.5 degrees, but the present invention is not limited thereto. For example, if the display range of the LED arc display 1 of the present invention is 0 to 180 degrees, and the if the curvature of the display surface 110 about the longitudinal direction is about 1.4 degrees, then it means that the LED arc display 1 of the present invention can accommodate about 128 LED matrix units 100 about the longitudinal direction L1; and if the display range of the LED arc display 1 of the present invention about the latitudinal direction L2 is −30 to 90 degrees, then it means that the LED arc display 1 of the present invention about the latitudinal direction can accommodate about 80 LED matrix units 100.

The outermost periphery of the display surface 110 of the LED matrix unit 100 has an outer contour 111. In the present invention, the outer contour 111 of the display surface 110 is non-quadrilateral, namely excluding the traditional shapes with for sides such as a rectangle or a trapezoid. For example, the outer contour 111 of the display surface 110 may be polygonal or of other irregular shape other than being quadrilateral. Preferably, the outer contour 111 of the display surface 110 at least has five sides. In the following embodiment, the outer contour 111 of the display surface 110 of the LED matrix unit is taken as hexagonal as an example to illustrate the technical features of the LED arc display of the present invention, but the invention is not limited thereto.

In an embodiment of the present invention, a protrusion portion 111*a* is formed on one side of the outer contour 111 of the display surface 110, a recess portion 111*b* is formed on the opposite side. The shape of the protrusion portion 111*a* corresponds to the shape of the recess portion 111*b*, namely, the shape of the protrusion portion 111*a* can act in concert with the shape of the recess portion 111*b*, causing the protrusion portion 111*a* of the outer contour 111 of any one LED matrix unit 100 to embed into the recess portion 111*b* of the outer contour 111 of another LED matrix unit 100, so as to assist in the assembling and fixing two adjacent LED matrix units 100 about the longitudinal direction L1. For example, in the present embodiment, the shape of the protrusion portion 111*a* may exhibit a sharp angle structure, whereas the shape of the recess portion 111*b* may exhibit a reentrant angle structure corresponding to the sharp angle structure.

Moreover, in the present embodiment, the display surface 110 is structurally symmetrical about the longitudinal direction, and at least two sides of the outer contour 111 of the display surface 110 are parallel in the longitudinal direction. By means of this design, when plural LED matrix units 100 are assembled side by side about the same latitudinal line, the existing assembly convenience can be kept and close arrangement can be readily achieved.

Figure 1:
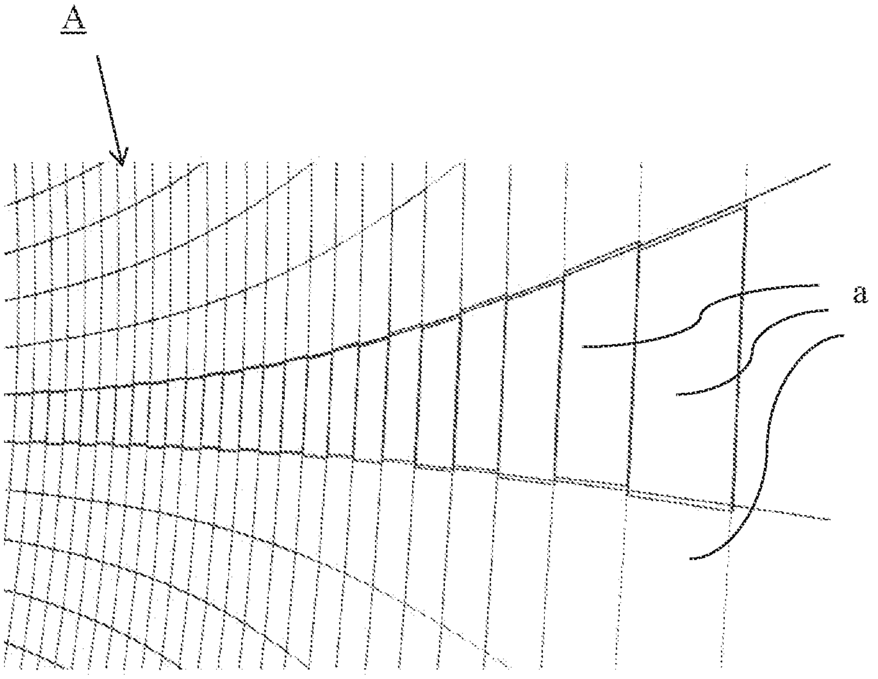
FIG.1(PRIOR ART)
FIG. 1 is a partial schematic of the prior art LED arc display.
Figure 5:
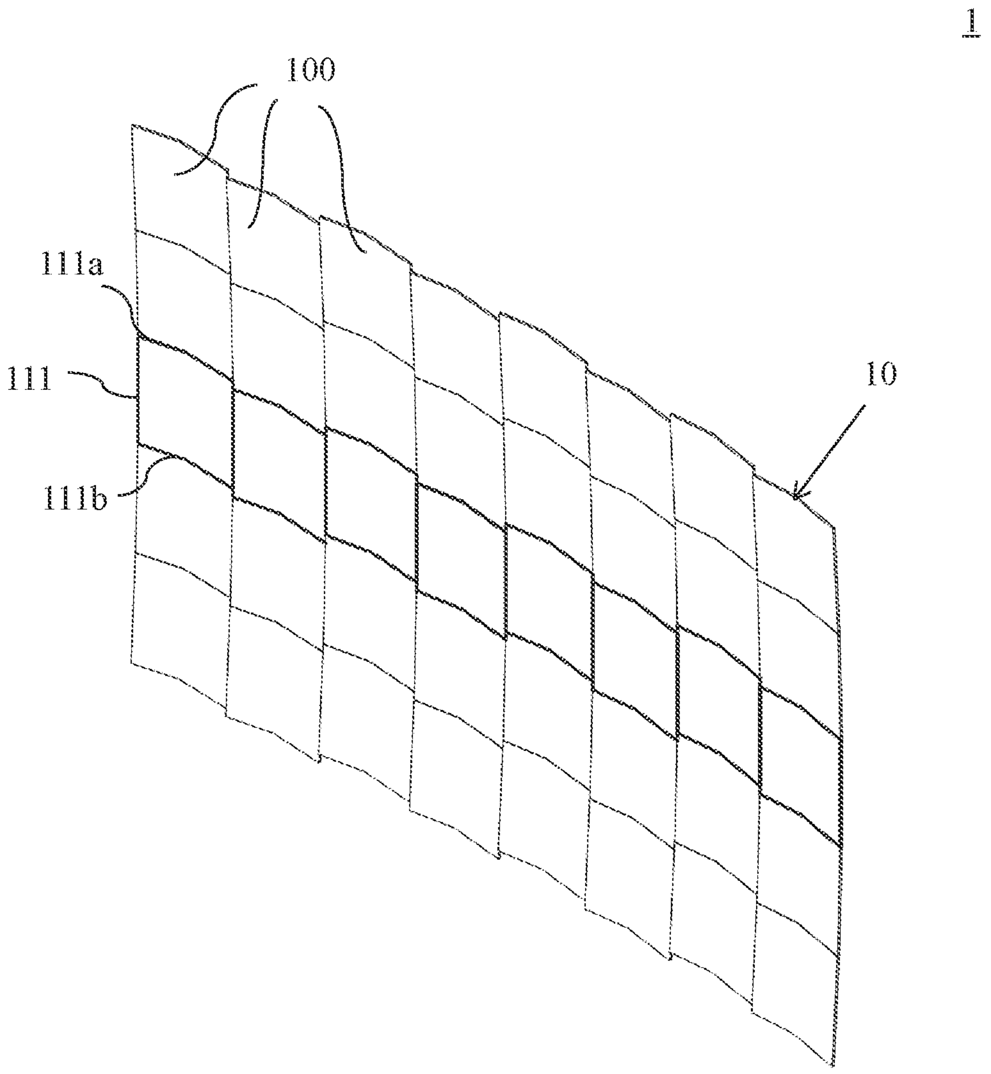
FIG. 5 is a partial schematic of the LED arc display of the present invention.

Please refer to FIG. 5 which is a partial schematic of the LED arc display of the present invention. As shown in FIG. 5, the LED arc display 1 of the present invention is assembled from plural independent LED matrix light-emitting units 100, and each LED matrix light-emitting unit 100 is non-quadrilateral (hexagonal in this embodiment, for example). Taking the modularized LED matrix array module 10 as an example, plural LED matrix light-emitting units 100 along the same latitudinal location, even if completely aligned, the upper and lower sides will form a jagged line due to the protrusion portion 111*a* and the recess portion 111*b* of the outer contour 111 of the display surface 110 of each LED matrix light-emitting unit 100, reducing the gap between two adjacent LED matrix light-emitting units 100. Accordingly, during the assembly process, even if there are assembly tolerances for the plurality of LED matrix light-emitting units 100 located along the same latitudinal line, the jagged line on the upper and lower sides will not cause significant changes, so that the human eye tends to be more relaxedly discriminative towards the allowable splicing tolerance or/and the break gap, thereby improving the unsmooth visual experience presented by the traditional LED arc display A in FIG. 1.

Figure 6:
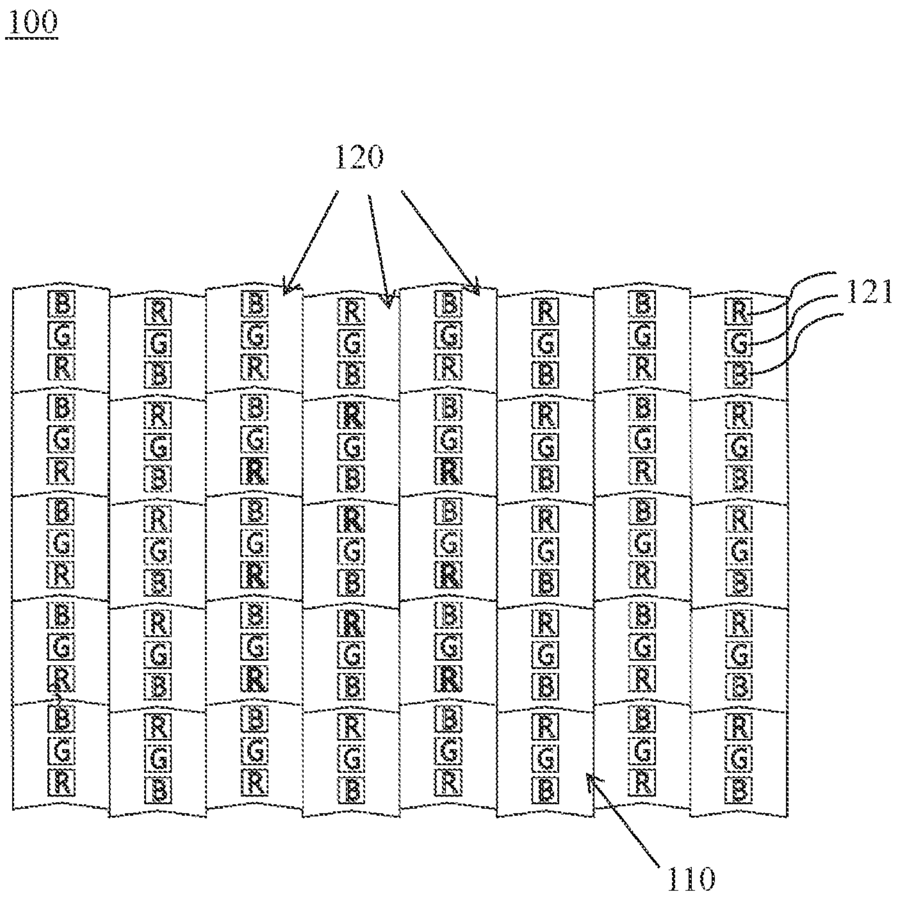
FIG. 6 is a schematic of a plurality of LED components in the LED matrix unit of the LED arc display of the present invention.

Please refer to FIG. 6 for a schematic of a plurality of LED elements in the LED matrix unit of the LED arc display device of the present invention. As shown in FIG. 6, in an embodiment of the present invention, each LED matrix unit 100 further includes a plurality of LED elements 120, and each LED element 120 includes a plurality of light sources 121 of different colors (for example, three primary color light sources such as red, green, and blue). And the arrangement order of the plurality of light sources 121 of any LED element 120 is different from the arrangement order of the plurality of light sources 121 of another adjacent LED element 120. For example, when the multiple light sources 121 of any LED element 120 are arranged in the order of red, green, and blue, the multiple light sources 121 of another LED element 120 adjacent thereto are arranged in the order of blue, green, and red. Accordingly, the arrangement sequence of the plurality of light sources 121 of the plurality of LED elements 120 in the LED matrix unit 100 adopts a non-single-direction staggered arrangement, so that the LED arc display of the present invention can avoid visual chromatic aberration due to different up, down, left, and right angles of the arc.

In summary, the LED arc display of the present invention can improve the convenience of transportation and assembly through the modular design, and the non-quadrilateral contour design for each LED matrix unit can also make the gap between the adjacent two LED matrix units after assembly smoother to produce a better visual experience.

The above implementations are essentially only auxiliary descriptions, and are not intended to limit the embodiments of the application subject or the applications or uses of the embodiments. In addition, although at least one illustrative example has been presented in the foregoing embodiments, it should be understood that the present invention can still have a large number of variations. It should also be understood that the embodiments described herein are not intended to limit the scope, use, or configuration of the requested subject matter in any way. On the contrary, the foregoing embodiments will provide a convenient guide for those skilled in the art to implement one or more of the embodiments. Furthermore, various changes can be made to the function and arrangement of the components without departing from the scope defined by the scope of the patent application, and the scope of the patent application includes known equivalents and all foreseeable equivalents at the time the patent application is filed.

What is claimed is:

1. An LED arc display comprising:

at least one LED matrix array module, wherein each LED matrix array module is composed of a plurality of LED matrix units arranged regularly to form a plurality of columns, and an upper edge of each of the plurality of columns is offset from an upper edge of an adjacent one of the plurality of columns; wherein each LED matrix unit includes a display surface, wherein the display surface has an outer contour, wherein the outer contour of the display surface has at least five sides; wherein each LED matrix unit further includes a plurality of LED components, wherein each LED component includes a plurality of light sources of different colors, and a color arrangement order of the plurality of light sources of each LED component is different from another color arrangement order of the plurality of light sources of an adjacent LED component;

wherein the outer contour of the display surface forms a protrusion portion and a recess portion, and the shape of the protrusion portion corresponds to the shape of the recess portion; wherein the protrusion portion of the outer contour of the display surface of each of the plurality of LED matrix units is embedded to the recess portion of the outer contour of the display surface of an adjacent one of the plurality of LED matrix units.

2. The LED arc display according to claim 1, further including at least one adjustment component, the least one adjustment component being connected to at least one LED matrix array module, so as to adjust the least one LED matrix array module by means of the least one adjustment component about at least one of the three axes.

3. The LED arc display according to claim 1, wherein a curvature of the display surface about the longitudinal direction is 1.4 degrees.

4. The LED arc display according to claim 1, wherein a curvature of the display surface about the latitudinal direction is 1.5 degrees.

5. The LED arc display according to claim 1, further including at least one support frame, wherein the at least one LED matrix array module is disposed on the at least one support frame.

6. The LED arc display according to claim 1, wherein the outer contour of the display surface is hexagonal.

7. The LED arc display according to claim 1, wherein the display surface is structurally symmetrical about the longitudinal direction.

8. The LED arc display according to claim 7, wherein at least two sides of the outer contour of the display surface are parallel in the longitudinal direction.

* * * * *